No. 814,325.  
PATENTED MAR. 6, 1906.  
T. S. PERKINS & R. P. JACKSON.  
CONTROLLER OPERATING MEANS.  
APPLICATION FILED JUNE 6, 1904.  
4 SHEETS—SHEET 3.

WITNESSES:  
Fred H. Miller  
Otto S. Schairer

INVENTORS  
Thomas S. Perkins  
Ray P. Jackson  
BY Neeley G. Carr ATTORNEY

No. 814,325. PATENTED MAR. 6, 1906.
T. S. PERKINS & R. P. JACKSON.
CONTROLLER OPERATING MEANS.
APPLICATION FILED JUNE 6, 1904.

4 SHEETS—SHEET 4.

WITNESSES:
Fred N. Miller
Otto S. Schairer

INVENTORS
Thomas S. Perkins
& Ray P. Jackson
BY
Wesley G. Carr
ATTORNEY

UNITED STATES PATENT OFFICE.

THOMAS S. PERKINS AND RAY P. JACKSON, OF WILKINSBURG, PENNSYLVANIA, ASSIGNORS TO WESTINGHOUSE ELECTRIC & MANUFACTURING COMPANY, A CORPORATION OF PENNSYLVANIA.

CONTROLLER-OPERATING MEANS.

No. 814,325.  Specification of Letters Patent.  Patented March 6, 1906.

Application filed June 6, 1904. Serial No. 211,370.

*To all whom it may concern:*

Be it known that we, THOMAS S. PERKINS and RAY P. JACKSON, citizens of the United States, and residents of Wilkinsburg, in the county of Allegheny and State of Pennsylvania, have invented a new and useful Improvement in Controller-Operating Means, of which the following is a specification.

Our invention relates to controlling apparatus for electric motors, and particularly to devices employed in connection with systems for the control of a plurality of electric motors from a more or less remote point.

Our invention has for its object to provide simple means for operating the controllers in the circuits of electric motors, which means may be conveniently governed from a remote point, but which shall otherwise be automatic in operation.

Systems have heretofore been devised for the control of railway-trains having one or more of the cars equipped with propelling-motors, the operation of the motors being ordinarily controlled from a single convenient location in the train by means of a master-controller which governs the circuits to devices or unit-switches which in turn govern the main motor-circuits. The devices or the switches in the main motor-circuits of the system in connection with which our invention is employed are governed by means of a controller which is actuated by the mechanism comprising our invention, the operation of the said mechanism being controlled from a convenient location by means of a simple master-controller.

Our invention is illustrated in the accompanying drawings, in which—

Figure 1:
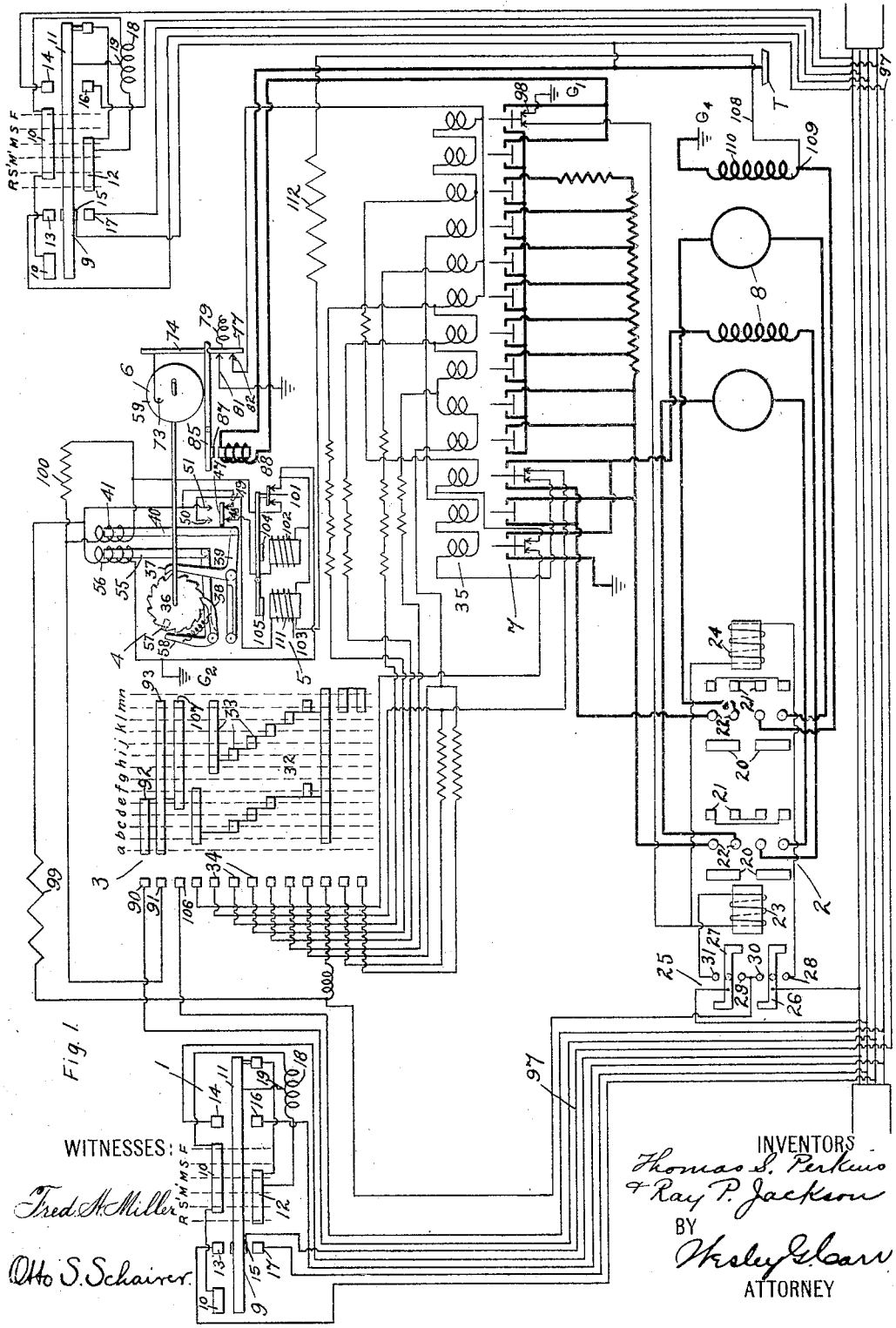
Figure 2:
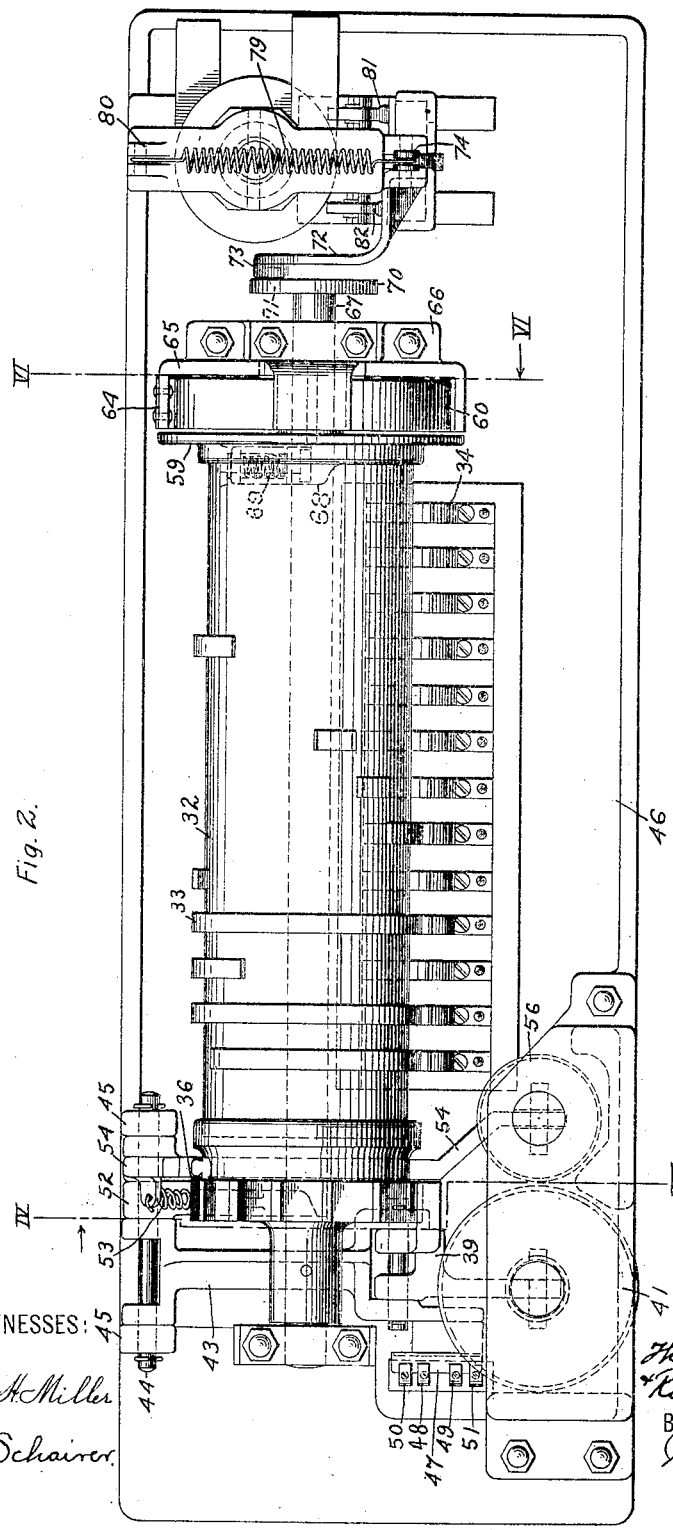
Figure 3:
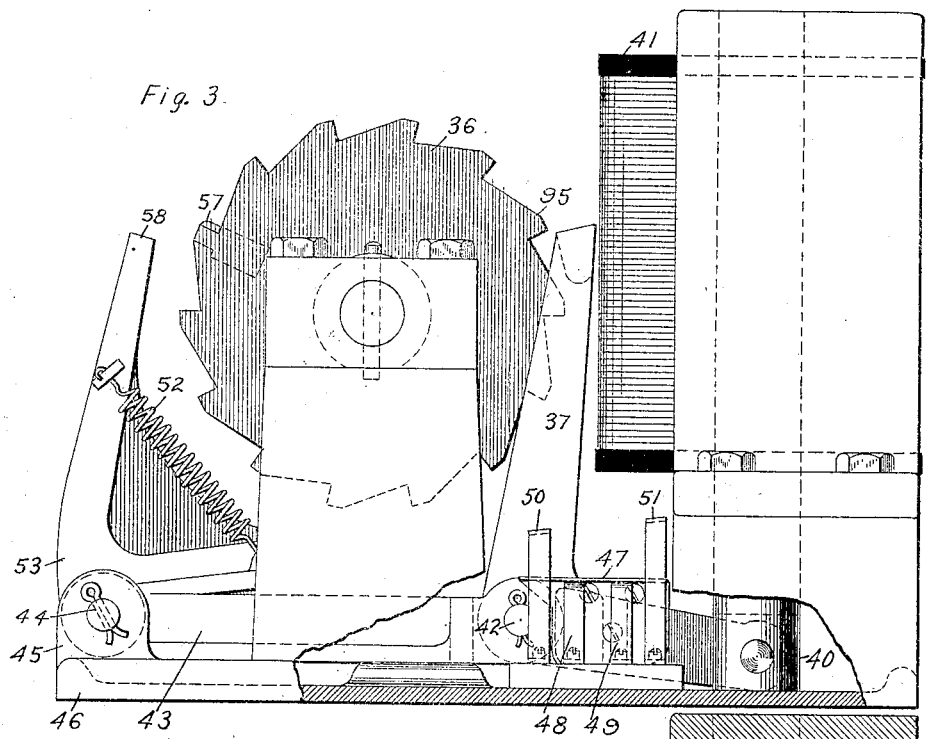
Figure 4:
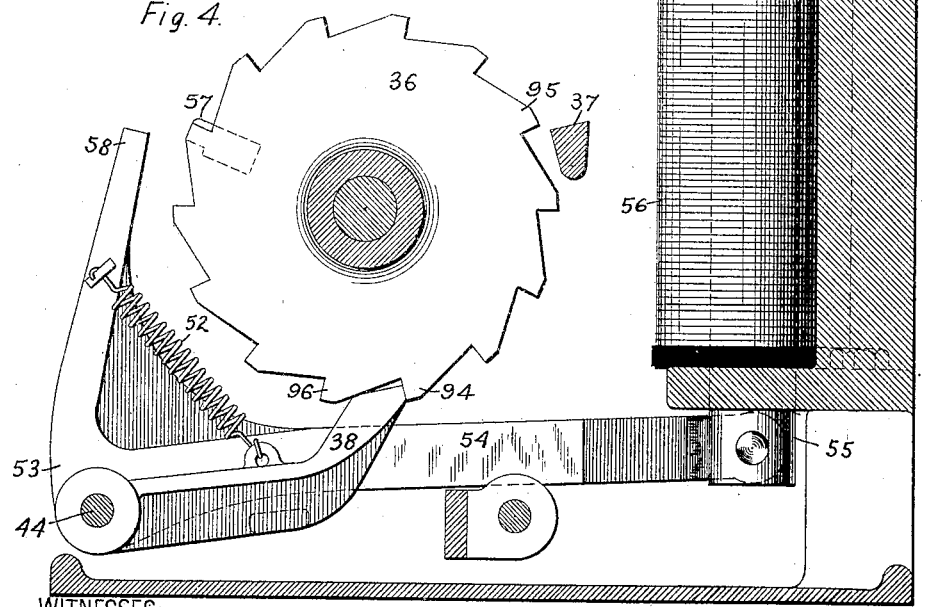
Figure 5:
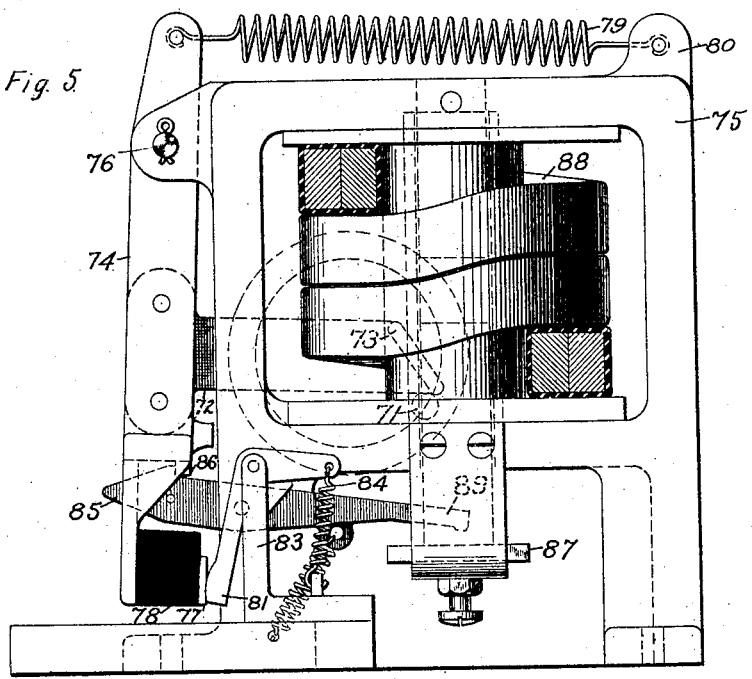
Figure 6:
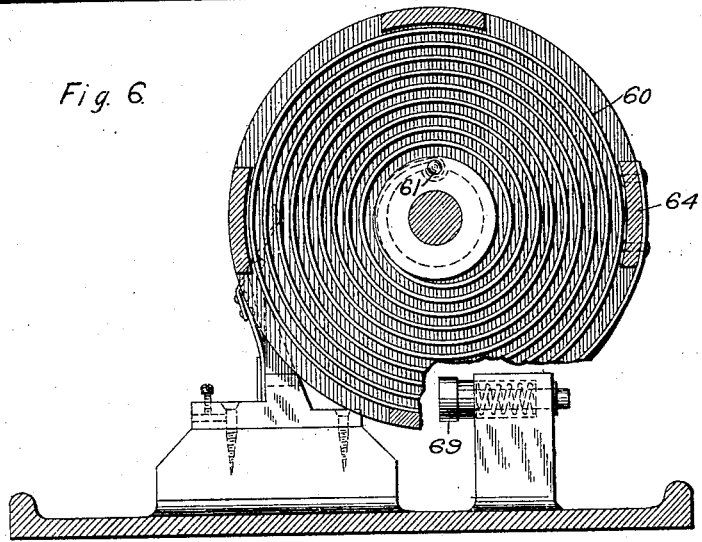
Figure 7:
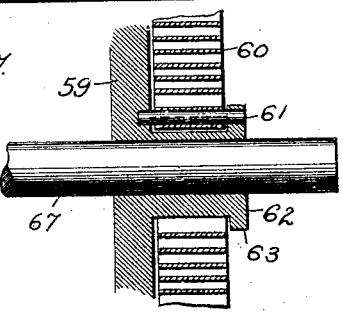

Figure 1 represents diagrammatically the system of control in connection with which our invention is employed. Fig. 2 is a plan view of the controller and its operating means for the circuits of the switches which govern the motor-circuits. Fig. 3 is a view in end elevation of the operating means shown in Fig. 1, a portion of the supporting-base being broken away. Fig. 4 is a view, partially in end elevation and partially in section, on line IV IV of Fig. 2. Fig. 5 is a view in end elevation of the overload-release device. Fig. 6 is a view in section on line VI VI of Fig. 2; and Fig. 7 is a sectional view of the parts shown in Fig. 6, the section being at right angles to that of Fig. 6.

The system of control in connection with which our invention is employed comprises as its principal features a master controller-switch 1, a reversing-switch 2, a controller 3, operating means 4 therefor, a time controller device 5, an overload-release device 6, unit-switches 7, and motors 8.

The master controller-switch 1 comprises a rotatable drum 9, upon which are mounted drum-segments 10, 11, and 12, which are adapted to engage with corresponding contact-fingers 13, 14, 15, 16, and 17, according to the direction and degree of rotation of the drum, and a blow-out coil 18, having its terminals connected, respectively, to the drum-segments 10 and 12 and its middle point 19 to the drum-segment 11.

The reversing-switch 2 is employed for the purpose of controlling the direction of the current through the armature-windings of the motors 8, and consequently the direction of motion of the train, provided the system is employed for controlling the operation of a train. The reversing-switch comprises a movable member that is provided with contact-strips 20 and 21, which are adapted to engage with corresponding contact-fingers 22, the said fingers being connected, respectively, to the terminals of the armature and field-magnet windings of the motors 8, substantially as shown. Magnets 23 and 24 are provided for operating the reversing-switch, the strips 20 engaging the contact-fingers 22 when the magnet 24 is energized and the strips 21 engaging the contact-fingers 22 when the magnet 23 is energized. Operated by means of the same magnets and simultaneously with the movement of the reversing-switch are interlocking switches 25, which govern the circuits of the operating-magnets 23 and 24, these switches comprising strips 26 and 27, which are adapted to engage, respectively, with contact-fingers 28 and 29 or with contact-fingers 30 and 31, and are indicated in Fig. 1 as occupying an abnormal intermediate position.

The controller 3 comprises a drum 32, upon which are mounted drum-segments 33, that are adapted to engage with corresponding contact-fingers 34, which in turn are connected with terminals of corresponding magnet-coils 35 of the unit-switches 7, substantially as shown.

Mounted upon one end of the drum 32 is a ratchet-wheel 36, which is engaged by an operating-pawl 37 and a holding-pawl 38. The pawl 37 constitutes one arm of a bell-crank lever, the other arm 39 of which is pivoted to an armature 40 of an operating-magnet 41 and the elbow of which is pivotally attached by a pin 42 to one end of a link 43. The other end of the link 43 is pivotally mounted upon a rod 44, which is supported by lugs 45, that may be cast integral with a base 46, upon which the drum 32 and its operating devices are mounted.

Supported by the link 43, but insulated therefrom, is an interlocking switch 47, which is adapted to make electrical connection between terminals 48 and 49 or between terminals 50 and 51, according to the position of the link.

The pawl 38 is fulcrumed upon the rod 44 and is connected, by means of a spring 52, to a bell-crank lever 53, the latter being also fulcrumed upon the rod 44 and having the free end of its arm 54 pivoted to the armature 55 of a retaining-magnet 56. One side of the ratchet-wheel 36 is provided with a lug 57, with which the free end of the arm 58 of the bell-crank lever 53 engages when the armature 55 of the retaining-magnet 56 is released, which is when the controller-drum 32 is in its initial position.

Mounted at the opposite end of the drum 32 are means for yieldingly opposing forward rotation of the drum and for returning it to its initial position when the operating devices are released, said means comprising a disk 59, rigidly secured to the drum 32 or to its shaft, and a coil-spring 60, having its inner end connected to a pin 61, one end of which is secured in the face of the disk 59, substantially as shown in Fig. 7. Projecting from the disk 59 is a cylindrical hub 62, having a flange 63 at its outer end in which the other end of the pin 61 is seated. The outer end of the spring 60 is secured to an arm 64, that projects from a stationary bracket 65, which is mounted upon a bearing-support 66 for the shaft 67 of drum 32. Upon the exposed side of the disk 59 is a lug 68, which engages a spring-buffer 69 of any suitable form—such, for example, as that shown in Fig. 6—when the controller-drum is returned to its initial position by the spring 60.

Mounted upon one end of the shaft 67 is a disk 70, to one face of which a pin 71 is secured in any suitable manner. An extended arm 72, having at its free end a lug 73, that is adapted to engage with the pin 71, is attached to a lever 74, which is fulcrumed to a frame 75 by a pin 76 and which carries at one end a strip 77 of conducting material that is insulated therefrom by means of suitable non-conducting material 78. A spring 79 is attached at one end to the opposite end of the lever 74 and at its other end to a lug 80 on the frame 75. The strip 77 is provided for the purpose of electrically connecting together two bell-crank contact-terminals 81 and 82, which are pivotally mounted in stationary brackets 83 and are normally held in contact with the strip 77 by springs 84.

A trigger 85, which is pivoted to the frame 75, is normally adapted to engage with a catch 86 on the lever 74 and to thus retain the strip 77 in contact with the terminal pieces 81 and 82; but when the trigger does not engage the catch 86 the strip 77 is thrown out of contact with the said terminal pieces by the action of the spring 79 upon the lever 74. An armature 87 is actuated by a winding 88, which is energized when an overload occurs upon the motors 8 and strikes the free end 89 of the trigger 85, and thereby releases the lever 74. When the controller-drum 32 is returned to its initial position by the spring 60, the pin 71 engages the lug 73 of the arm 72 and returns the lever 74 to the position shown in the drawings. The circuits are then in proper condition for operation of the motors; but it is evident that to effect this condition it is necessary that the drum 32 be returned to its initial position.

The operation of the actuating means for the controller 3 may be understood by assuming that the controller-drum is in its initial position, in which the fingers 90 and 91 are respectively in contact with the drum-segments 92 and 93, and that the retaining-magnet 56 is energized to raise its armature 55, and thereby rock the bell-crank lever 53 to move its arm 58 away from the stop 57 and the holding-pawl 38 into engagement with the tooth 94 of the ratchet-wheel 36. If the operating-magnet 41 is next energized, its armature 40 will be raised and the pawl 37 will be thereby moved into engagement with the tooth 95 of the ratchet-wheel 36, the bell-crank lever 37 39 turning on its fulcrum 42 in the end of the link 43 until such engagement is effected, after which the lever 37 39 and the link 43 will rotate together about the axis of the rod 44. The ratchet-wheel 36 will be thus rotated through an arc corresponding to the pitch of its teeth as the armature 40 is raised to the limit of its movement by the magnet 41. As the ratchet-wheel 36 is rotated, the pawl 38 slides over tooth 96 and by means of the spring 52 is drawn into engagement with its operating-face. When the controller is in use, the retaining-magnet 56 is normally energized in order that its armature may cause the holding-pawl 30 to move in engagement with the successive teeth of the ratchet-wheel as the drum is rotated and the operating-magnet 41 is alternately energized and deënergized to advance and retract the pawl 37 until a predetermined degree of rotative movement of the drum 32 is effected.

When the master controller-switch 1 is in its first position, which is position F in Fig. 1, the circuit is completed from the trolley or third rail T through conductor 97, contact-finger 15, drum-segment 11, one-half the blow-out coil 18, drum-segment 10, contact-finger 14, to conducting-strip 26, and then if this strip engages contact-finger 28 the circuit continues through these members, magnet-winding 24, and interlocking switch 98 to the ground at G'. Magnet-coil 24 is thereby energized and the reversing-switch is thrown so that conducting-strips 20 engage contact-fingers 22 and also so that the conducting-strips 26 and 27 of the interlocking switch 25 engage, respectively, with the contact-fingers 30 and 29. The circuits through the armature and field-magnet windings of the motors 8 are then completed for forward motion of the train, and a circuit is also completed from the conducting-strip 26, through contact-finger 30, resistance 99, and retaining-magnet 56 to the ground at $G^2$. The retaining-magnet 56 being thus energized raises its armature 55, and thereby moves the arm 58 of bell-crank lever 53 away from the stop 57 and the pawl 38 into engagement with the tooth 94 of the ratchet-wheel 36 preparatory to beginning forward movement of the controller-drum 32.

If the reversing-switch 2 is in position to insure forward motion of the train, which is the position just described, and it is desired to reverse the direction of motion, the drum of the master controlling-switch 1 is turned in the opposite direction to that just described to position R. The circuits are then completed in a manner similar to that just described, except that the magnet-winding 23 becomes energized, and the reversing-switch is thereby thrown, so that the conducting-strips 21 engage the contact-fingers 22.

When the switch 1 is moved to the position S, an additional circuit is completed from the drum-segment 10 by reason of the engagement of that segment with the contact-finger 13 through contact-finger 90, drum-segments 92 and 93, contact-finger 91, operating-coil 41 and resistance 100 in parallel, and switch 101 to the ground at $G^2$. The discharge-resistance 100 is provided in shunt to the operating-magnet winding 41 for the purpose of adjusting the rate of operation of the armature 40 and the pawl 37, the rate being varied by varying the amount of the resistance 100. Switch 101 is provided for the purpose of making and breaking the circuit through the operating-coil 41 and is operated by means of the time-controller 5, which comprises as its essential features two magnet-coils 102 and 103, which when energized respectively attract armatures 104 and 105. The circuits through these time controller-magnets are governed by the movement of the interlocking switch 47, which is actuated simultaneously with the operation of the armature 40. The switch 101 is normally closed on account of the attraction of the armature 104 by its corresponding magnet-coil 102, a circuit being established through the time-controller-magnet coil 102 simultaneously with that through the retaining-magnet coil 56. The operating-magnet 41 being energized raises the interlocking switch 47, so that it makes contact with terminals 50 and 51, and thereby completes the circuit through the time-controller-magnet coil 103, the armature 105 being thereby attracted and the switch 101 opened. By these means the circuit of the operating-magnet coil 41 is opened and the interlocking switch 47 returns to the position in which it makes contact between the terminals 48 and 49, and the operating-magnet coil 102 is again energized.

The operating-magnet 41 is alternately energized and deënergized until the position $f$ of the controller-drum 32 is reached, and in order to effect a further rotation of the said drum it is necessary to move the master controlling-switch 1 to the position M. The circuit is then completed from the drum-segment 11 through one-half the blow-out coil 18, drum-segment 12, contact-fingers 16 and 106, drum-segments 107 and 93, contact-finger 91, and, as before described, through the actuating mechanism. The mechanism will then continue to operate until the position $n$ of the controller 31, which is the position corresponding to full-speed running conditions of the motors, is reached. The actuating mechanism is then stopped, since the contact-fingers 91 and 106 no longer engage the drum-segments 93 and 107.

The circuits through the actuating mechanism are similar if the master controller-switch 1 is moved in the opposite direction from that just described—i. e., through the positions R', S', and M', which are for backward running of the train.

As the drum 32 is rotated the drum-segments 33 are engaged by corresponding contact-fingers 34, the circuits of the proper unit-switch magnet-coils 35 are closed, and the motors are connected in series or in parallel relation to each other with the proper amount of resistance in their circuits, according to the position of the said drum. Since the operation of these unit-switches has no bearing upon our present invention, except that the switches are elements of the system in which our invention is employed, we deem it unnecessary to describe the circuits in detail.

All of the current supplied to the motors passes through the coil 88 of the overload-release device 6, and from the previous description of the operation of this mechanism it is readily understood how an overload on the motors or an excessive amount of current supplied to them operates to cause the arm 74 to be released and electrical connection between the conducting-strip 77 and terminals 81 and 82 to be interrupted, whereby the circuits through the magnet-coils 35 of the unit-swiches are opened. It is obvious then that, contrary to the usual practice, if an overload occurs upon the motors the main motor-circuit is not interrupted by means of a separate circuit-breaker, since the unit-switches themselves act as circuit-breakers.

A conductor 108 connects terminal 109 of field-magnet winding 110, which is farthest from the ground $G^4$, with such a point 111 within the time-controller-magnet coil 103 or with a point external to that winding that if greater than a predetermined amount of current is supplied to the motors while they are being accelerated through the operation of the controller 32 and the unit-switches 7 the time-controller-magnet coil 103 becomes energized, and thereby opens the switch 101. The operating-magnet coil 41 cannot be energized again until the motors are accelerated to such a speed that the current supplied to them is not greater than the before-mentioned predetermined amount. Under normal conditions but very little current is supplied from the main circuit to the time-controller-magnet coil 103, since a resistance 112 is included in the circuit between the terminal 109 of the field-magnet winding and the point 111 in the time-controller-magnet winding with which the conductor 108 is connected, the resistance 112 being susceptible of variation in order to adjust or predetermine the amount of current which shall flow in the main motor-circuits before the switch 101 shall be operated by the current which flows through the magnet-coil 103. The point 111 may also be varied in order to adjust or predetermine the amount of current derived from the main circuit which shall operate the switch 101, since by varying the location of this point the number of ampere-turns included in the time-controller-magnet coil 103 may be varied. Since the conductor 108 connects with a point 111 in the motor-circuits which is only a few volts higher in potential than that of the ground $G^4$, it is evident that only a small voltage is impressed upon the magnet-winding 103, and consequently the problem of the insulation presents no serious difficulty.

It is obvious that the details of construction of the apparatus comprising our invention may be varied widely within the scope of our invention, and we do not wish the invention limited to the specific details shown and described or in any other particular, except by such restrictions as may be imposed by the prior art.

We claim as our invention—

1. The combination with a controller-drum and resilient means for opposing forward motion thereof, of a ratchet-wheel, a pawl engaging said ratchet-wheel, a magnet for alternately actuating and releasing said pawl and a resistance in shunt to the winding of said magnet whereby the rate of operation of said pawl may be adjusted.

2. The combination with a controller-drum and resilient means for opposing forward motion thereof, of a ratchet-wheel, a pawl engaging said ratchet-wheel, a magnet-winding which is alternately inactive and energized, an armature therefor which operates said pawl and a resistance in shunt to the said magnet-winding whereby the rate of operation of said pawl may be regulated.

3. The combination with a controller-drum and resilient means for opposing forward rotation thereof, of a ratchet-wheel, a pawl engaging therewith, a magnet for alternately actuating and releasing said pawl, a second pawl, a magnet for causing said second pawl to engage said ratchet-wheel when the controller-drum is being operated in the forward direction and means operated by said last-named magnet for securing the controller-drum in its initial position when not in operation.

4. The combination with a drum, of a magnet for imparting rotative impulses thereto and two other magnets which are alternately energized through the operation of said first-named magnet and which thereby alternately make and break the circuit through the winding of said first-named magnet.

5. The combination with a controller-drum and resilient means for opposing forward rotation thereof, of a ratchet-wheel, a pawl engaging therewith, an operating-magnet winding and an armature therefor which actuates said pawl, a switch which is alternately opened and closed by said armature, time controller-magnets which are alternately energized by the operation of said switch and a second switch actuated by said controller-magnets for alternately making and breaking the circuit of said operating-magnet winding.

In testimony whereof we have hereunto subscribed our names this 31st day of May, 1904.

THOMAS S. PERKINS.
RAY P. JACKSON.

Witnesses:
H. B. MYER,
BIRNEY HINES.